(12) United States Patent
Reguzzi

(10) Patent No.: US 6,826,975 B2
(45) Date of Patent: Dec. 7, 2004

(54) GEAR WHEEL CONSTRUCTION

(76) Inventor: Luigi Reguzzi, Via Kennedy 33/41, Mariano Comense (IT)

( * ) Notice: Subject to any disclaimer, the term of this patent is extended or adjusted under 35 U.S.C. 154(b) by 0 days.

(21) Appl. No.: 09/876,461

(22) Filed: Jun. 7, 2001

(65) Prior Publication Data
US 2002/0002092 A1 Jan. 3, 2002

(30) Foreign Application Priority Data

Jul. 3, 2000 (IT) .................................... MI20000399 U

(51) Int. Cl.$^7$ .............................................. F16H 55/12
(52) U.S. Cl. .............................. 74/440; 74/409; 74/444; 474/162
(58) Field of Search ................................. 474/162, 163, 474/95–98; 74/409, 440, 444, 445

(56) References Cited

U.S. PATENT DOCUMENTS

| | | | | |
|---|---|---|---|---|
| 569,216 A | * | 10/1896 | Lindsay | ....................... 474/162 |
| 2,999,396 A | * | 9/1961 | Kaczmarski | ................. 474/162 |
| 4,473,317 A | * | 9/1984 | Bolang | ........................ 403/359 |
| 4,630,496 A | * | 12/1986 | Yasuoka | ....................... 74/409 |
| 4,964,842 A | * | 10/1990 | Howard | ....................... 474/152 |
| 5,596,905 A | * | 1/1997 | Kurosawa | ..................... 74/443 |
| 5,833,562 A | * | 11/1998 | Walker, Sr. | ................... 474/96 |
| 5,870,928 A | * | 2/1999 | Genter et al. | .................. 74/440 |

* cited by examiner

Primary Examiner—David A. Bucci
Assistant Examiner—Timothy McAnulty
(74) Attorney, Agent, or Firm—Hedman & Costigan, P.C.

(57) ABSTRACT

A gear wheel comprises a first gear wheel portion, including first half-teeth, which can be coupled to a second gear wheel portion, including second half-teeth, by adjustable coupling means, so that the first and second half-teeth form by pairs the teeth of the gear wheel. The second gear wheel portion can be turned with respect to the first gear wheel portion about the rotary axis of the gear wheel, and can be locked by the adjustable coupling, so as to change the distance of the first and second half-teeth in each pair.

1 Claim, 3 Drawing Sheets

GEAR WHEEL CONSTRUCTION

BACKGROUND OF THE INVENTION

The present invention relates to a gear wheel construction.

More specifically, the present invention relates to a gear wheel construction which can be used in a precision conveyor device including an apron driven by a timing belt.

More specifically, the gear wheel construction according to the invention can be used, in particular, in a conveyor device in which the timing belt slides on a frame, according to at least a top flat path, driven by driving rollers, and being entrained about two end pulleys, at the end portions of its driving path.

At an intermediate region of the top flat driving path, the gear wheel, or toothed pulley, according to the invention, is arranged at a bottom between a pair of flat pulleys which, by cooperating with the subject gear wheel, cause the timing belt to follow a downward directed loop.

The gear wheel is driven by a driving means including, depending on requirements, a step by step motor, a D.C. motor, a brushless motor, the driving means being coupled to the timing belt through a geared unit.

As is known, the apron or conveyor belt devices used in precision processing operations, such as to convey workpiece to a machining tool, must be able of locating the workpiece in a very accurate manner, with respect to the machining tool.

A problem affecting the above disclosed system is that of the wear of the teeth of the gear wheel, with a consequent backlash between the gear wheel and timing belt, which negatively affect the movement precision of the timing belt and apron.

SUMMARY OF THE INVENTION

Accordingly, the aim of the present invention is to provide an improved gear wheel construction, which is suitable to overcome the above disclosed drawback.

Within the scope of the above mentioned aim, a main object of the present invention is to provide such a gear wheel which is very simple construction-wise and very reliable in operation.

Another object of the present invention is to provide such a gear wheel construction allowing to recover the backlash due to the wear of the gear wheel teeth, and this by a simple and quick adjusting operation.

According to one aspect of the present invention, the above mentioned aim and objects, as well as yet other objects, which will become more apparent hereinafter, are achieved by a gear wheel construction, characterized in that said gear wheel construction comprises a first gear wheel portion, including first half-teeth, which can be coupled to a second gear wheel portion, including second half-teeth, by adjustable coupling means, thereby said first and second half-teeth form by pairs teeth of said gear wheel, said second gear wheel portion being suitable to turn about said first gear wheel portion, about a rotary axis of said gear wheel, and being locked by said coupling means so as to change the distance of the first and second half teeth in each said pair.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of a merely indicative, but not limitative, example in the accompanying drawings, where.

DESCRIPTION OF THE PREFERRED EMBODIMENT

Figure 1:
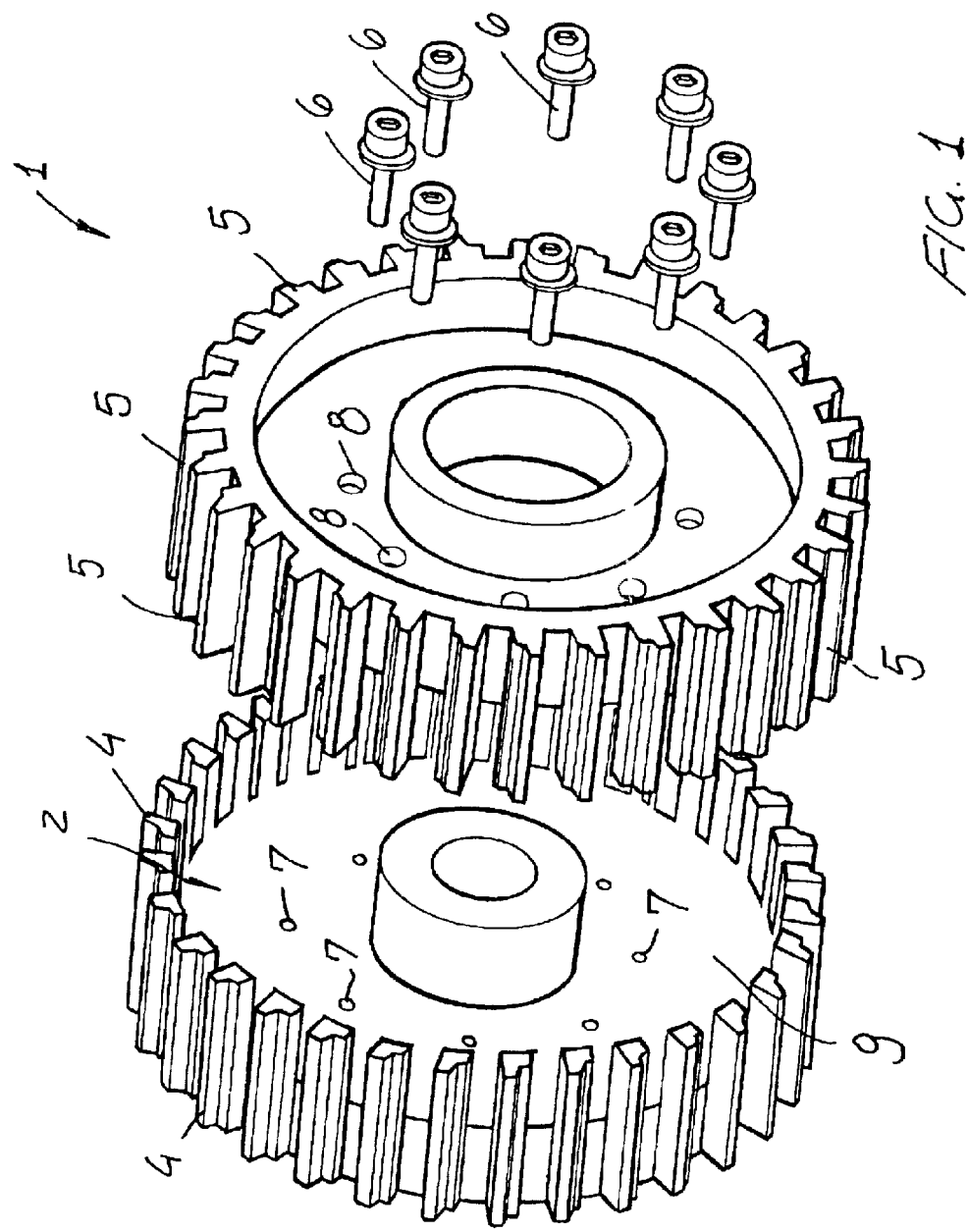
FIG. 1 is an exploded perspective view of the gear wheel construction according to the invention.
Figure 2:
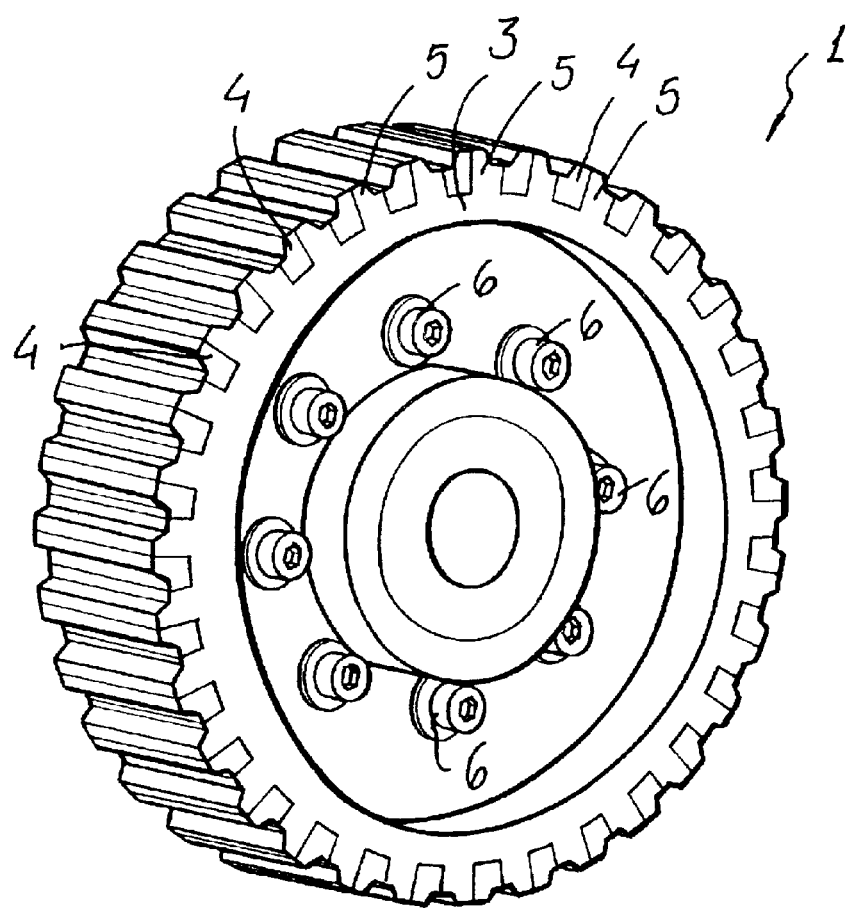
FIG. 2 is an assembled perspective view of the gear wheel construction according to the invention.
Figure 3:
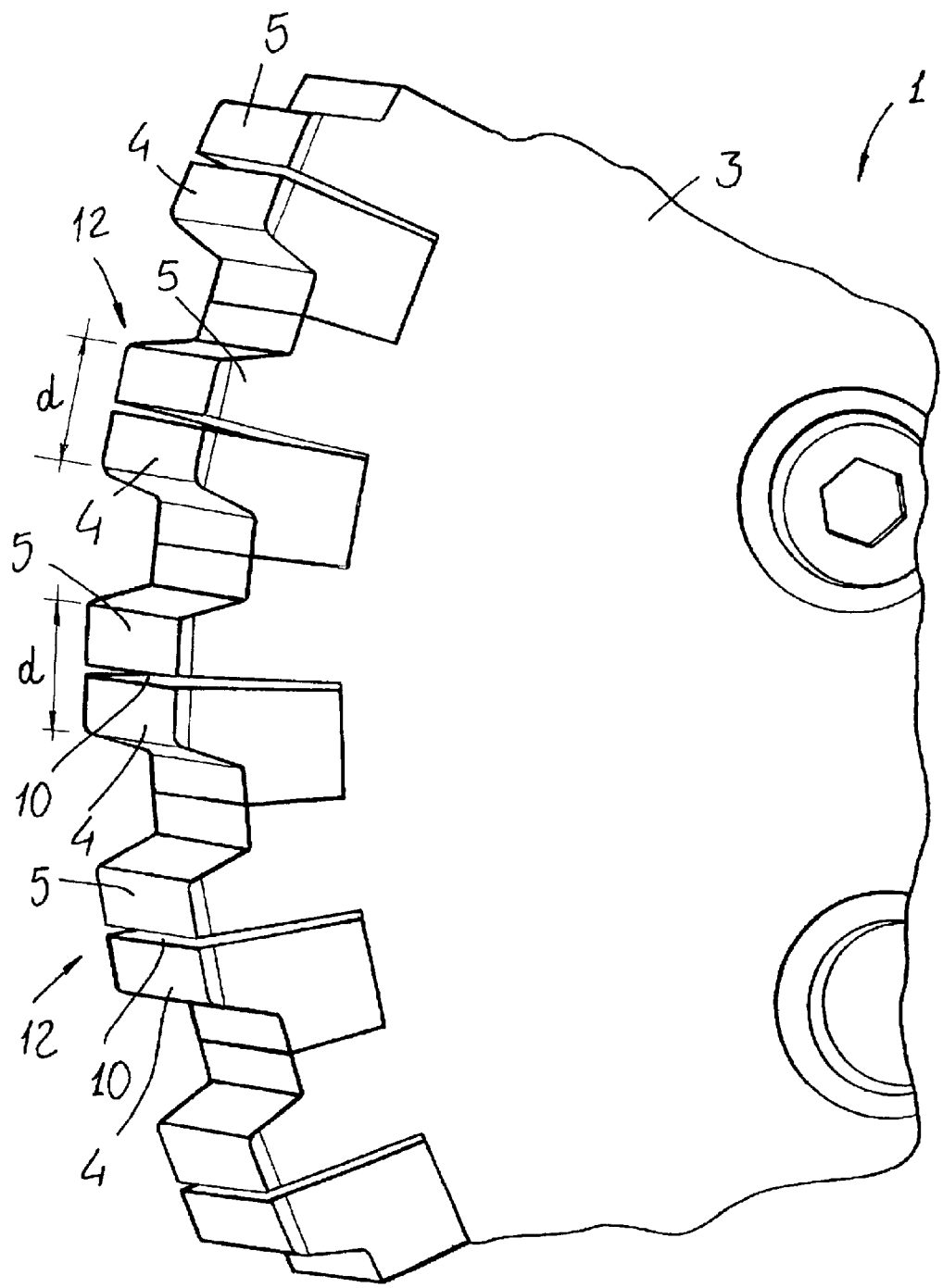
FIG. 3 is a partial perspective view, on an enlarged scale, of the gear wheel construction according to the invention.

With reference to the number references of the above mentioned figures, the gear wheel construction according to the present invention, which has been generally indicated by the reference number 1, has been specifically designed to be used in a precision conveyor device, not shown in the figures, comprising an apron driven by a timing belt.

The timing belt slides on a frame, according to at least a top flat driving path, as controlled by driving rollers, and being entrained about two end pulleys, arranged at the end portions of said driving path.

At an intermediate region of said top flat driving path, is arranged the gear wheel or toothed pulley according to the invention, which, in particular, is located at the bottom between a pair of flat pulleys which, by cooperating with the subject gear wheel, cause the timing belt to follow or define a downward directed loop.

In particular, the gear wheel is driven by driving means including, depending on requirements, a step by step motor, a D.C. motor, or a brushless motor, through a suitable geared unit.

The gear wheel construction 1 according to the invention comprises a first gear wheel portion 2 including first half-teeth 4, which can be coupled to a second gear wheel portion 3, including second half-teeth 5, through adjustable coupling means, comprising, for examples, screws 6 for engagement in corresponding threaded seats or recesses 7 formed in the first gear wheel portion 2 and passing through enlarged recesses 8 formed in the second gear wheel portion 3.

The gear wheel portions 2 and 3 can be coupled by their mutual facing surfaces.

Of the latter, only the surface 9 of the first gear wheel portion can be seen in the figures, and so that the flank outer surfaces 10 and 11, respectively, of the half teeth 4 and 5 are also facing one another.

At the start, the gear wheel portions 2 and 3 are assembled mutually locked so as to cause the facing flank surfaces 10 and 11 of the half teeth 4 and 5 to contact one another, thereby each pair of half teeth 4 and 5 will form a tooth 12.

In operation, each tooth 12 will be warn on its outer surfaces, thereby reducing the overall dimension, i.e. the distance between the flank outer surfaces.

In order to hold this distance constant, the locking screws 6 are released, to allow the second gear wheel portion 3 to turn with respect to the first gear wheel portion 2, about the rotary axis of the gear wheel, thereby moving away the facing flank surfaces 10 and 11 of the half-teeth 4 and 5 to recover the desired distance.

The mutual rotary movement of the gear wheel portions 2 and 3 is permitted by the enlarged recesses 8 formed in the second gear wheel portion 3, which enlarged recesses allow the screws 6 to be radially displaced with respect to the second gear wheel portion 3, which can be locked at its new position, with respect to the first gear wheel portion 2, by simply clamping the screws 6.

It has been found that the invention fully achieves the intended aim and objects.

In fact a gear wheel construction has been provided, which has been specifically designed for application to a conveyor device for use in automatized machining lines, or in individual machines, requiring several precision locating operations on a plurality of workpieces to be machined.

In practicing the invention, the used materials, and the size thereof, can be any, according to requirements and the status of the art.

What is claimed is:

1. A gear wheel construction for belt conveyor devices, said gear wheel construction including a multiplicity of teeth, each formed by a pair of adjoining contacting half teeth, comprising a first gear wheel portion having a first web surface, said first half gear wheel portion including a first plurality of first half teeth side, each first half tooth of which defines a first half tooth side, a second gear wheel portion having a second web surface, said second gear wheel portion including a second plurality of second half teeth, each second half tooth of which defines a second half tooth side, adjustable coupling means for rotatively coupling said first and second gear wheel portions, one against the other, said adjustable coupling means comprising radially displaceable screw means engaging in corresponding threaded holes formed in said in said first gear wheel portion and passing through enlarged holes formed in said second gear wheel portion, thereby, as said first and second gear wheel portions are coupled each first half tooth side of said first half teeth cooperates with a respective second half tooth side of said second half teeth to provide a single tooth of said gear construction wherein said first web surface engages said second web surface even when a respective pair of a first half tooth side and a second half tooth side are spaced apart from one another.

* * * * *